United States Patent [19]
Herbert et al.

[11] 3,734,546
[45] May 22, 1973

[54] FLEXIBLE PIPE CONNECTION

[75] Inventors: John T. Herbert; Paul E. Sullivan; Stanley P. Vitt, Jr., all of Redlands, Calif.

[73] Assignee: Lockheed Aircraft Corporation, Burbank, Calif.

[22] Filed: Mar. 30, 1972

[21] Appl. No.: 239,515

[52] U.S. Cl. ..................285/49, 277/30, 285/54, 285/234
[51] Int. Cl..............................F16l 27/10
[58] Field of Search....................285/49, 50, 51, 52, 285/54, 223, 234, DIG. 1, 118; 277/30; 64/11 R

[56] References Cited

UNITED STATES PATENTS

| 2,278,479 | 4/1942 | Parker | 285/54 |
| 3,390,899 | 7/1968 | Herbert et al. | 285/118 X |
| 3,680,895 | 8/1972 | Herbert et al. | 285/223 X |
| 502,038 | 7/1893 | Herman | 285/51 |
| 3,519,289 | 7/1970 | Haffer | 285/49 |

Primary Examiner—Thomas F. Callaghan
Attorney—George C. Sullivan et al.

[57] ABSTRACT

A flexible pipe connection configured to prevent the transmission of sounds produced in the pipeline. The joint has an annular housing and a nipple member partially submerged in the housing. The housing and nipple are connected by two elastomeric seal assemblies which provide flexibility and sound isolation between the housing and the nipple member.

4 Claims, 5 Drawing Figures

FLEXIBLE PIPE CONNECTION

BACKGROUND OF THE INVENTION

1. Field of the Invention

This invention relates to a flexible pipe connection, or joint, and particularly to a connection which prevents or minimizes the transmission of sounds produced in a pipeline.

The prevention of sound transmission in pipelines is particularly important on submarines or surface ships engaged in military operations which depend upon stealth and silence for their effectiveness. The undesirable sounds in these vehicles are commonly generated by the motors and pumps which control the flow of various fluids in the pipelines. These sound sources must be isolated to prevent detection of the vehicle location.

2. Description of the Prior Art

A typical joint used in the past has an outer, annular housing and a nipple member partially submerged in the housing cavity. The submerged end of the nipple member has an external protuberance comprised of two adjoining conical surfaces forming a V-shaped cross-section. Annular rubber inserts are placed between each of the conical surfaces and the housing to seal the joint and prevent sound transmission through the joint. Due to the geometry of the housing and nipple member, these rubber inserts have dissimilar shapes and different centers of rotation. The inserts are retained by a washer and a threaded nut fitting into the housing.

Because of the internal geometry of the prior art joint, the rubber inserts are subjected to excessive wear and deterioration during use. Also, during assembly of the joint, the nipple often becomes misaligned with respect to the housing center line, and special tools must be used to prevent or minimize this misalignment. Another difficulty with this joint is that there is some noise produced by the flow of fluid through this joint due to its internal configuration. The rubber inserts do not completely fill the cavity between the nipple member and the housing, and therefore there is a certain amount of turbulent flow in the joint.

SUMMARY OF THE INVENTION

To eliminate the deficiencies of the prior art joint, the present invention provides a flexible joint which has an annular housing with a central cavity and a nipple partially submerged in the cavity. The submerged portion of the nipple has a flared end which serves as the base for two annular elastomeric seal assemblies placed between the nipple and the housing. The first of these assemblies is disposed on the interior surface of the flared end and bridges the nipple and housing in such manner as to provide a constant inside diameter for the joint. This inside diameter corresponds to the inside diameter of the pipes being joined, and thus a smooth, quiet flow of fluid through the joint is assured. The second, larger, sealing assembly is placed on the exterior surface of the flared end of the nipple and is configured to close the central cavity of the housing and to clear the nipple and housing for flexure movement. The first and second assemblies are generally in the form of spherical segments and have a common center of rotation in the longitudinal axis of the joint, which permits omnidirectional flexure movement of the joint.

More specifically, the first seal assembly has an inner ring which rests in a slip fit on a shoulder adjacent to the flow opening of the housing, an outer ring which seats on the interior surface of the flared end of the nipple, and an elastomeric ring sandwiched between the inner and outer rings. The second seal assembly has a collar in a slip fit with the exterior surface of the flared end of the nipple, a flange member in contact with the housing, and a reinforced elastomeric member between the collar and the flange. The slip fits between the first seal assembly and the housing and between the second seal assembly and the nipple allow for slight axial movement of the nipple with respect to the housing when the joint is subjected to tensile and compressive forces. This movement prevents the elastomeric elements from being subjected to tensile forces which otherwise might lead to joint failure.

The second seal assembly is designed to be the pressure containment member of the joint. Consequently, at least one small opening is made in the inner ring of the first assembly to provide for fluid passage from the joint central bore to the housing cavity. This equalizes the pressure in the bore and cavity and eliminates any pressure differential on the first seal assembly so that it can be made smaller than the second seal assembly.

To prevent noise generation from the movement of parts in the joint, rubber rings, which may be in the form of O-rings, are placed in the inner and outer rings of the first seal assembly adjacent the housing and nipple member and between the collar of the second seal assembly and the flared end of the nipple.

Comparative pressure-deflection tests run on the prior art joint and the present joint show that the present joint has a much longer service life, largely due to the spherical configurations of the present seal assemblies. Also, acoustic tests on both joints show that the present joint has better acoustic properties than the prior art joint from the standpoint of structure-created noise and flow-induced noise. The present joint is also easier to assemble and to service than the prior art joint, the servicing consisting of the replacement of the elastomeric units.

Other features and advantages of the present invention will become more apparent from the following detailed description of typical forms and applications of the invention taken in conjunction with the accompanying drawings.

DESCRIPTION OF THE PREFERRED EMBODIMENTS

Figure 1:
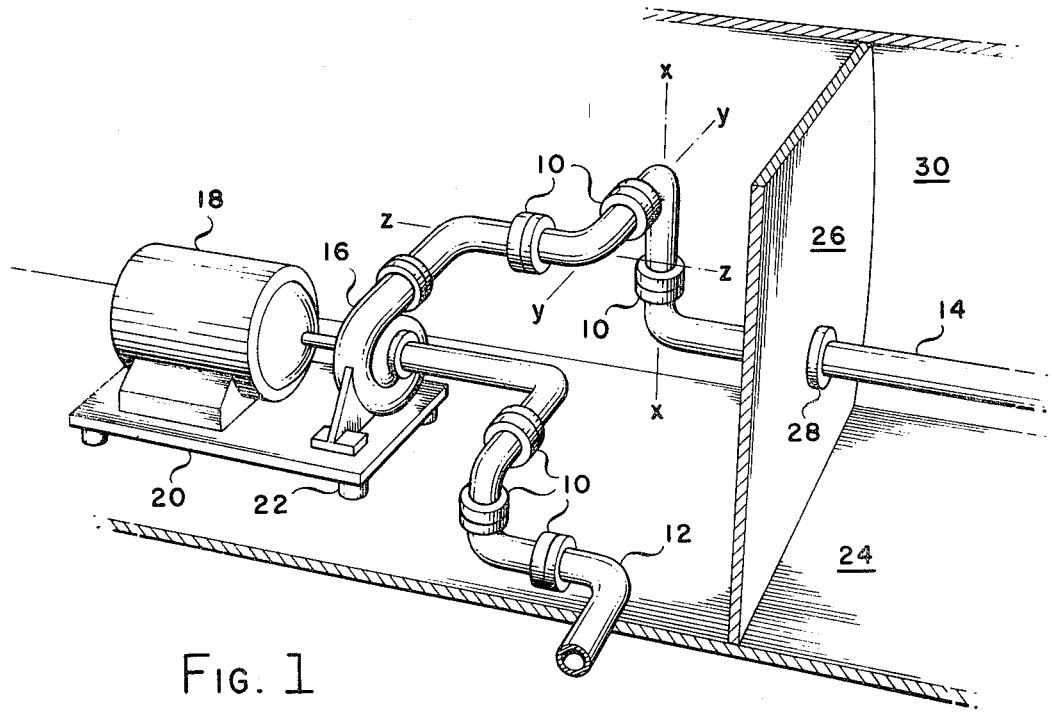
FIG. 1 is a perspective view showing how the present joints may be utilized in a pipeline connected to a pump and motor in a ship.

FIG. 1 shows six of the present joints or connections 10 utilized in a suction line 12 and discharge line 14 connected to a pump 16 actuated by an electric motor 18. The joints are mounted on the lines, as shown, to permit complete flexibility in the X, Y and Z axes during pump startup, operation and shutdown. The pump and motor are mounted on a platform 20 which is itself placed on elastomeric suspension mounts 22 attached to floor 24. The mounts 22 prevent or minimize the transmission of noises generated by pump operation to the floor.

As seen in FIG. 1, discharge line 14 passes through a bulkhead 26 and is constrained therein by a connector 28 welded or otherwise rigidly fixed to the bulkhead. It will be apparent that, if it were not for the presence of joints 10, any sounds generated at the pump could be transmitted along line 14 to the bulkhead 26 and to adjoining hull 30. From hull 30, the sounds could be propagated to the surrounding water where they may be detected by sensitive hydrophones.

Figure 2:
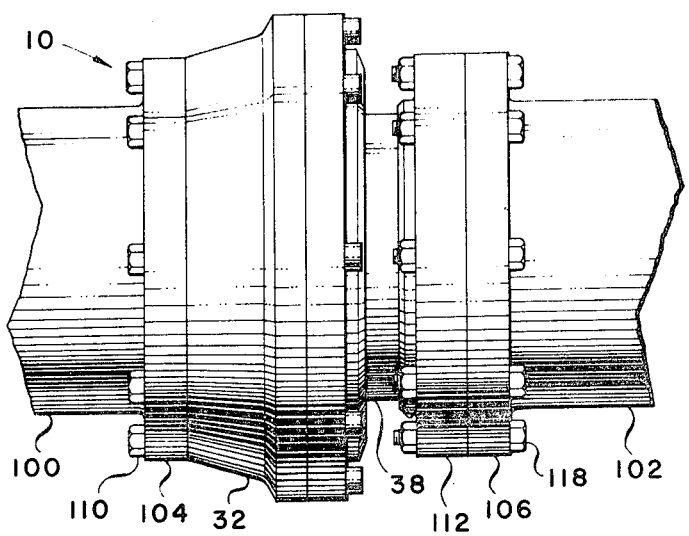
FIG. 2 is an elevational view showing the present joint connected to adjoining pipes.
Figure 3:
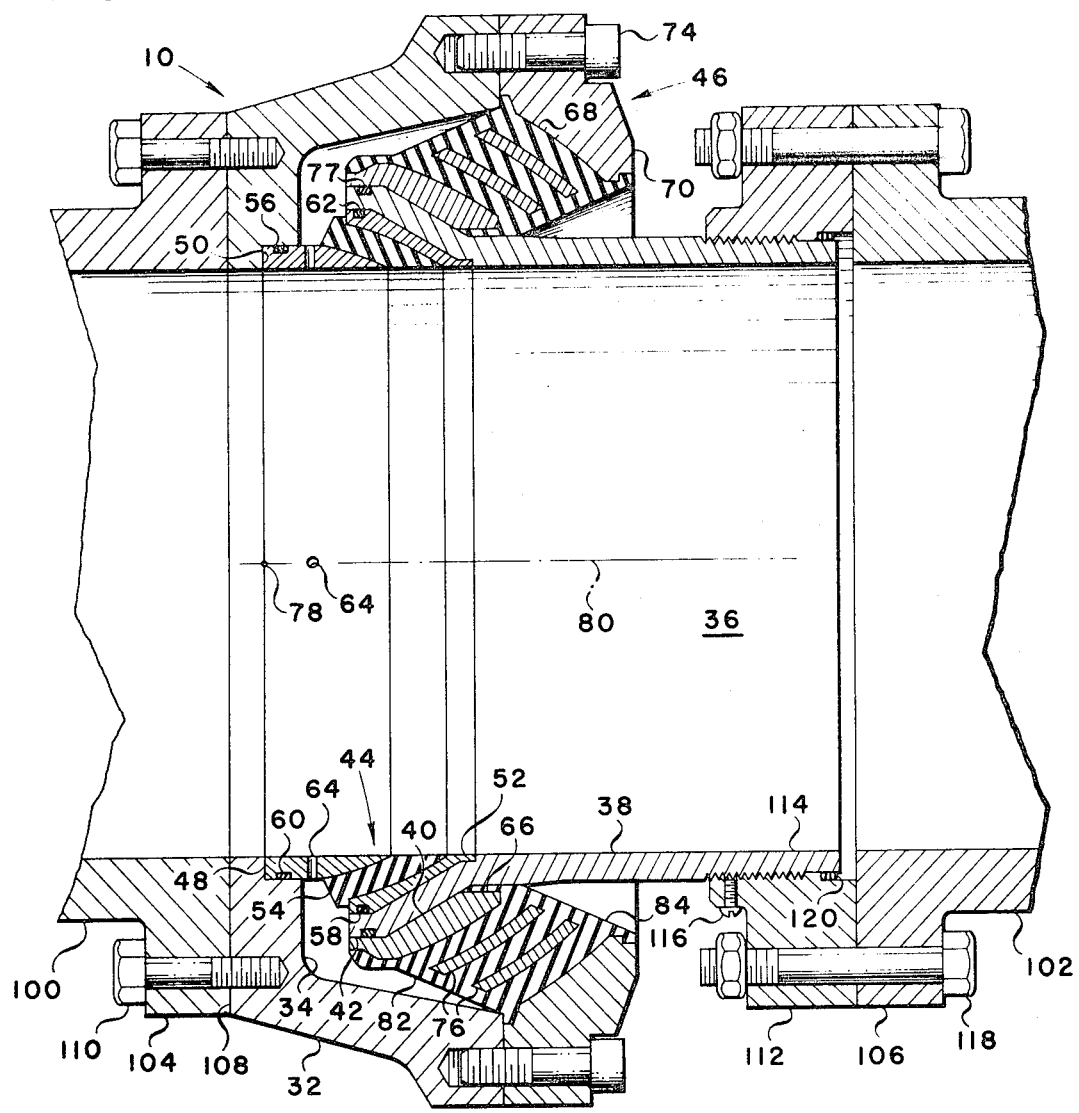
FIG. 3 is an enlarged, sectional, elevational view of the present joint.

As shown more clearly in FIGS. 2 and 3, the present joint 10 has an annular housing 32 having a cavity 34 and a central bore or inside diameter 36. Partially submerged in cavity 34 is a nipple 38 having a flared, conical end 40 which terminates in a short cylindrical portion 42. Nipple 38 has the same inside diameter 36 as housing 32, said diameter corresponding to the inside diameter of the pipes joined. Cavity 34 is closed interiorly by an annular elastomeric seal assembly 44 and exteriorly by another annular elastomeric seal assembly 46.

The first seal assembly 44 is comprised of an inner ring 48 seating on housing shoulder 50 in a slip fit, an outer ring 52 disposed adjacent the inner conical and cylindrical surfaces of flared end 40, and an elastomeric pad or ring 54 sandwiched between the inner and outer rings. It will be noted that these components close the central cavity with the same inside diameter as the housing and nipple, thereby assuring a smooth flow of fluids through the present joint. In the fabrication of the assembly, the rings and pad are bonded together, giving an integral assembly. Although not shown, pad 54 may also be reinforced with metal rings, as in the case of large joints.

A small hole 64, or a series of holes, is drilled in the inner ring 48 to permit fluid passage from the joint central bore to the housing cavity. This equalizes the pressure on the seal assembly 44 and permits a relatively small size assembly.

To prevent seal assembly 44 from rattling with respect to the adjoining parts, inner ring 48 and outer ring 52 are provided with grooves 56, 58 which receive rubber rings 60, 62 in the form of conventional O-rings. Instead of metal, which is generally used, the rings 48, 52 may also be made of plastic or hard rubber, which would eliminate the use of rubber rings 60, 62.

Seal assembly 46 is comprised of a collar 66 disposed in a slip fit against the exterior conical and cylindrical surfaces of flared end 40 of nipple 38, an annular elastomeric member or pad 68 and a flange member 70 resting against flared end 72 of housing 32 and held thereto by fasteners 74. Pad 68 is reinforced with annular metal rings 76, as shown. Collar 66, pad 68, rings 76 and flange member 70 are bonded together to comprise an integral assembly. O-ring 77 in nipple portion 42 provides sealing between the assembly and the nipple.

To provide for flexure of the nipple with respect to the housing, the first and second seal assemblies 44, 46 have a common center of rotation 78 in the longitudinal axis 80 of the joint. Pad 68 has inside and outside free surfaces 82, 84 which are at an angle with respect to housing 32 and nipple 38 so as to provide clearance during flexure of the joint. Deflections of up to about 15° may be obtained with the present joint.

Figures 4, 5:
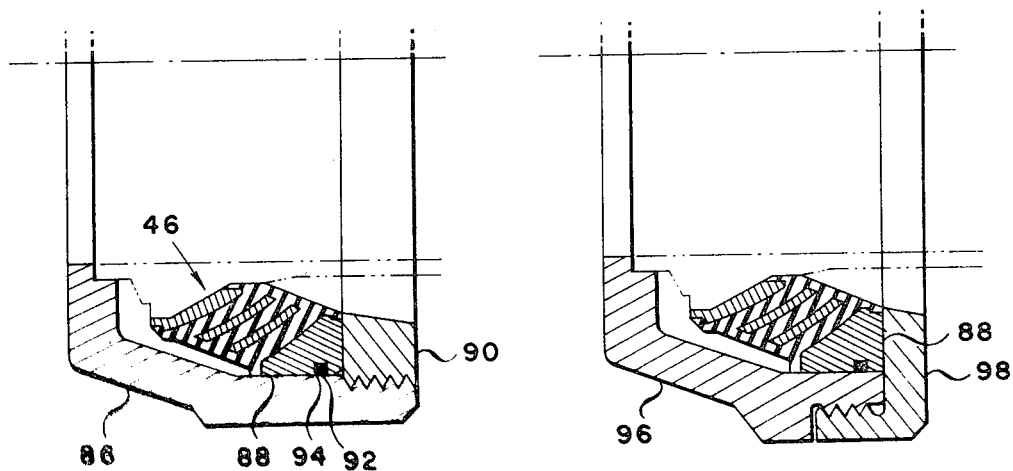
FIGS. 4 and 5 are schematic, sectional, elevational views of half of the present joint, showing alternative means for retaining the sealing assemblies in the housing cavity.

FIGS. 4 and 5 show alternative embodiments of the present joint wherein all previously described components are substantially the same except for the flange member in the second seal assembly and its placement with respect to the housing. In the FIG. 4 embodiment, the housing 86 is further extended than housing 32, providing for complete inclusion of flange member 88 within the housing cavity. Flange member 88 and the remainder of the seal assembly 46 are held in place by a retaining nut 90 adapted to be threaded onto the interior wall of housing 86. An O-ring 92 placed in groove 94 in member 88 provides for further fluid pressure sealing of the housing cavity. The FIG. 5 embodiment is substantially the same as the FIG. 4 embodiment except that flange member 88 is held in place within the central cavity of housing 96 by a retaining nut 98 which is adapted to be threaded onto the exterior surface of housing 96.

As shown in FIGS. 2 and 3, the present joint is attached to adjoining pipes 100 and 102 by means of flanges 104 and 106 which are integral with the respective pipes. Flange 104 is placed against the face 108 of housing 32 and held in place by fasteners 110. Flange 106 is placed against a flange member 112 which is threaded onto end 114 of nipple member 38. Provision is made for a set screw 116 to secure flange member 112 against further rotation. Fasteners 118 then join flange 106 and flange member 112. O-ring 120 provides sealing between flange member 112 and nipple 38.

In service, when the present joint is subjected to external or internal tensile forces tending to pull the housing and nipple member apart along the longitudinal axis, the second seal assembly 46 will compress slightly and the first seal assembly 44 will move away as a unit from the housing, leaving a slight gap between the vertical wall of inner ring 48 and the adjacent vertical wall of the housing. When the tensile forces are removed, the original positions of the joint components, as previously described, are restored by virtue of the elasticity of the elastomeric material. When the present joint is subjected to external compressive forces tending to push the housing and nipple together along the longitudinal axis, the first seal assembly 44 will compress slightly and the nipple 38 will move axially toward the housing, leaving a slight gap between the exterior conical surface of flared end 40 and the adjacent conical surface of collar 66 of the second seal assembly 46. When the compressive forces are removed, the original positions of the joint components are restored, as previously described. These slight movements of the joint components under tensile and compressive loadings of the joint prevent the elastomeric pads from being subjected to tensile forces which otherwise may lead to joint failure. However, these movements, which amount to about 0.050 inch for an 8 inch diameter joint do not affect the operation of the pressure seals or the load carrying surfaces in any way. Thus, a joint is provided which is capable of withstanding various loading conditions over longer periods than those obtained with joints known in the prior art.

Other variations and modifications of the present invention will be obvious to those skilled in the art and it is intended to cover in the appended claims all such modifications and equivalents as fall within the true spirit and scope of the invention.

We claim:

1. A flexible, sound isolation joint for pipelines comprising:
    an annular housing with a central cavity;
    a nipple partially submerged in said cavity;
    a flared end on the submerged portion of the nipple;
    a first annular, elastomeric seal assembly being disposed interiorly of said flared end and bridging said nipple and housing to provide a constant inside diameter for said joint;
    said first seal assembly having an inner ring in a slip fit with said housing, an outer ring in contact with the flared end of the nipple, and an elastomeric ring between said inner and outer rings, said inner ring having an opening to provide fluid passage between the joint interior and the central cavity;
    a second annular, elastomeric seal assembly being disposed exteriorly of said flared end and closing said central cavity;
    said second seal assembly having a collar in a slip fit with the flared end of the nipple, a flange member in contact with the housing, and a reinforced elastomeric member between the collar and the flange member;
    said seal assemblies having a common center of rotation in the longitudinal axis of said joint to provide omnidirectional flexure movement of said nipple with respect to said housing; and
    means for retaining said seal assemblies with respect to the housing.

2. A joint according to claim 1, wherein an O-ring is provided between the inner ring and the housing and an O-ring is provided between the outer ring and the flared end of the nipple.

3. A joint according to claim 1, wherein said retaining means comprise an extension of said flange member abutting against the end of said housing and fastener means holding said extension and said housing end.

4. A joint according to claim 1, wherein said retaining means comprises a retaining ring cooperating with said flange member, said ring being adapted to be threaded onto said housing.

* * * * *